United States Patent
Steigerwald et al.

(10) Patent No.: US 8,330,299 B2
(45) Date of Patent: Dec. 11, 2012

(54) DC TO DC POWER CONVERTERS AND METHODS OF CONTROLLING THE SAME

(75) Inventors: Robert Louis Steigerwald, Burnt Hills, NY (US); Ahmed Elasser, Latham, NY (US); Juan Antonio Sabate, Gansevoort, NY (US); Maja Harfman Todorovic, Niskayuna, NY (US); Mohammed Agamy, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/171,683

(22) Filed: Jun. 29, 2011

(65) Prior Publication Data

US 2012/0051095 A1    Mar. 1, 2012

(51) Int. Cl.
*H01H 9/54*    (2006.01)
(52) U.S. Cl. ........................................ 307/140
(58) Field of Classification Search .................. 307/140
See application file for complete search history.

(56) References Cited

U.S. PATENT DOCUMENTS

| | | | | |
|---|---|---|---|---|
| 7,557,532 B2 * | 7/2009 | Liu et al. | | 320/101 |
| 7,994,768 B2 * | 8/2011 | Park | | 323/283 |
| 2009/0296434 A1 | 12/2009 | De Rooij et al. | | |
| 2010/0142227 A1 * | 6/2010 | Min et al. | | 363/13 |

OTHER PUBLICATIONS

Bob Bell, "Introduction to Push-Pull and Cascaded Power Converter Topologies", Jul. 10, 2003, 44 pages.
Min et al., "A New Topology With High Efficiency Throughout All Load Range for Photovoltaic PCS", IEEE Transactions on Industrial Electronics, vol. 56, No. 11, Nov. 2009, pp. 4427-4435.
Adler, "A New DC/DC Switching Regulator Topology Enhances Efficiency and Power Density"; Proceedings of Powercon 11, Power Concepts, Inc., 1984, 4 pages.

* cited by examiner

*Primary Examiner* — Robert L. DeBeradinis
(74) *Attorney, Agent, or Firm* — Ann M. Agosti

(57) ABSTRACT

A power generation system configured to provide direct current (DC) power to a DC link is described. The system includes a first power generation unit configured to output DC power. The system also includes a first DC to DC converter comprising an input section and an output section. The output section of the first DC to DC converter is coupled in series with the first power generation unit. The first DC to DC converter is configured to process a first portion of the DC power output by the first power generation unit and to provide an unprocessed second portion of the DC power output of the first power generation unit to the output section.

17 Claims, 12 Drawing Sheets

DC TO DC POWER CONVERTERS AND METHODS OF CONTROLLING THE SAME

STATEMENT REGARDING FEDERALLY SPONSORED RESEARCH & DEVELOPMENT

This invention was made with United States government support under contract DE-EE0000572, awarded by the Department of Energy (DOE). The United States government has certain rights in the invention.

BACKGROUND OF THE INVENTION

The embodiments described herein relate generally to a photovoltaic (PV) power generation system, and more specifically, to methods and systems for extracting power from a photovoltaic collection system.

Solar energy has increasingly become an attractive source of energy and has been recognized as a clean, renewable alternative form of energy. Photovoltaic (PV) cells generate direct current (DC) power with the level of DC current being dependent on solar irradiation and the level of DC voltage dependent on temperature. When alternating current (AC) power is desired, an inverter is used to convert the DC power into AC power. Typically, PV inverters employ two stages for power processing with the first stage configured for providing a constant DC voltage and the second stage configured for converting the constant DC voltage to AC current and voltage that is compatible with the grid. Typically, the PV inverter uses a DC link as an intermediate energy storage step, which means that the PV inverter includes a DC to DC converter that converts the unstable PV array voltage to a stable DC voltage and a DC to AC inverter that subsequently converts the stable DC voltage into an AC current that can be injected onto the grid. The efficiency of the two-stage inverter is an important parameter affecting the performance of the PV system and is a multiple of the individual stage efficiencies.

In order to obtain a higher current and voltage, PV cells are electrically connected to form a PV module. In addition to a plurality of PV cells, the PV module may also include sensors, for example, an irradiance sensor, a temperature sensor, and/or a power meter. PV modules may also be connected to form a string and multiple strings may be connected to form a PV array. Typically, the DC voltages output by the PV array are provided to a grid inverter, for example, a DC to AC voltage inverter. The DC to AC voltage inverter converts the DC voltage to a single or three-phase alternating current (AC) voltage and current. The three-phase AC output can be provided to a medium voltage power transformer, which steps up the voltage to produce a three-phase medium-voltage AC that is injected into a power distribution grid.

Most PV power generation systems use a central DC to DC converter to convert the entire power output of the PV array resulting in a relatively high-cost and high-weight solution. Also, the central DC to DC converter typically uses a maximum power point tracker (MPPT) that includes sensors for measuring array voltage and current for use in computing array power. Such sensors are in addition to sensors needed to operate the DC to DC converter. Moreover, a disadvantage of a PV power generation system that includes a full-power conversion DC to DC converter is referred to as the efficiency compounding effect. The efficiency of a PV power generation system can be no higher than the efficiency of the central DC to DC converter. The total efficiency of the DC to AC conversion is reduced by 1% to 2% due to the compounding of the DC to DC converter efficiency and the DC to AC inverter efficiency. Furthermore, a fault in the full-power rated central DC to DC converter may cause a failure of the entire PV array. In order to prevent such a PV array failure, additional array series diodes and fuses are typically used to isolate a DC to DC converter failure.

BRIEF DESCRIPTION OF THE INVENTION

In one aspect, a power generation system configured to provide direct current (DC) power to a DC link is provided. The system includes a first power generation unit configured to output DC power. The system also includes a first DC to DC converter comprising an input section and an output section. The output section of the first DC to DC converter is coupled in series with the first power generation unit. The first DC to DC converter is configured to process a first portion of the DC power output of the first power generation unit and to provide an unprocessed second portion of the DC power output of said first power generation unit to said output section.

In another aspect, a DC to DC partial power converter is provided. The DC to DC partial power converter includes an input section configured to receive a first portion of a DC power output of a power generation unit. The DC to DC partial power converter also includes an output section configured to output a DC power that includes a first processed portion and a second unprocessed portion of the DC power output of the power generation unit for application to a DC link.

In yet another aspect, a method for controlling operation of a power generation system is provided. The power generation system includes at least one power generation unit and at least one partial power converter, wherein the at least one partial power converter includes a controller configured to control operation of at least one semiconductor switch. The method includes configuring the partial power converter to determine a level of current flowing through the at least one semiconductor switch and configuring the partial power converter to maximize the level of current flowing through the at least one semiconductor switch to maximize a power output of the at least one power generation unit.

DETAILED DESCRIPTION OF THE INVENTION

Figure 1:
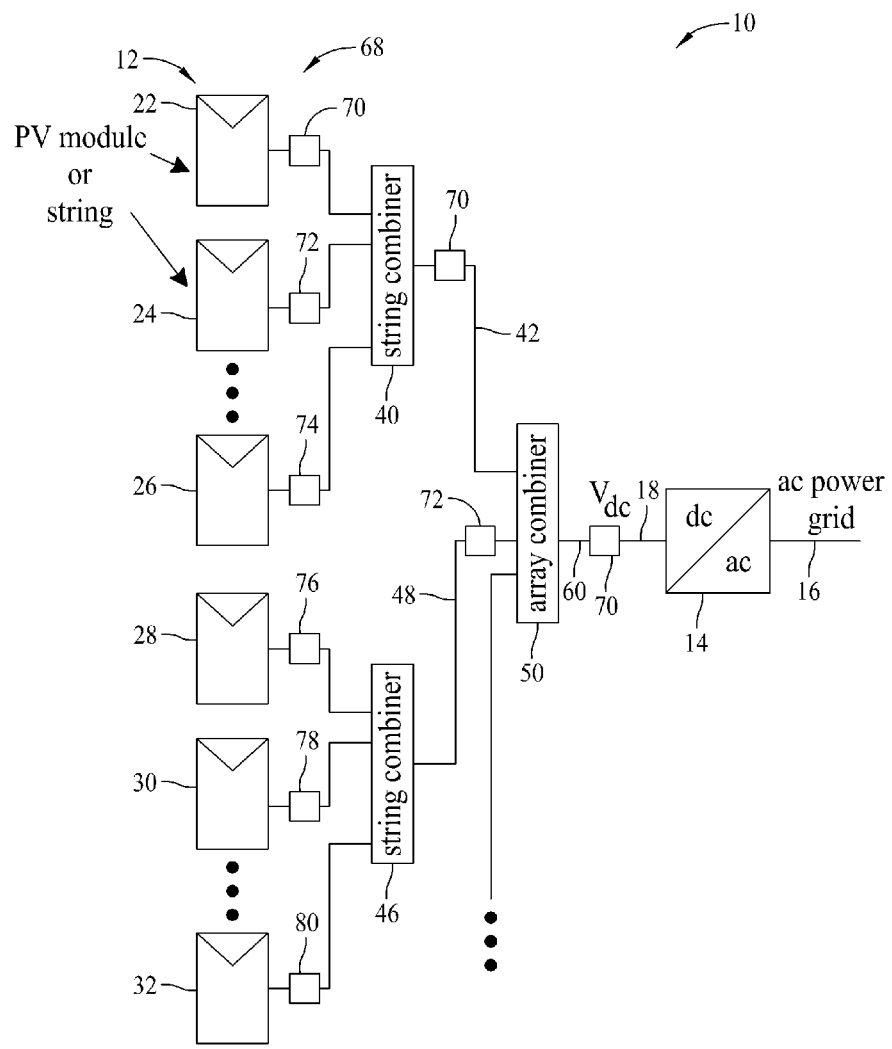
FIG. 1 is a block diagram of an exemplary photovoltaic (PV) power generation system.

The methods, systems, and apparatus described herein facilitate controlling a power output of at least one photovoltaic (PV) module included within a PV power generation system and converting the power output of the at least one PV module from direct current (DC) power to alternating current (AC) power for application to a power grid. A DC to DC converter is controlled to extract a maximum power from the at least one PV module feeding it. A percentage of the total power output by the PV module is processed by the DC to DC converter. Converter losses are minimized because only a fraction of the total power output of the PV module is processed by the DC to DC converter. Although described herein with respect to PV power generation systems, the methods, systems, and apparatus described herein may be applied generally to any power generation application.

The methods, systems, and apparatus described herein include a DC to DC power converter that is controlled to process only a fraction of the total power delivered by a PV module, string, or array, and by doing so, the DC to DC power converter controls the total power delivered to a high-power grid connected DC to AC inverter. Because only a fraction of the total power delivered to the DC to AC inverter is processed, losses are minimized, resulting in increased efficiency of the PV power generation system. Increasing conversion efficiency improves the overall energy yield. Furthermore, because the DC to AC inverter regulates the main system DC link voltage, a simple algorithm can be used to maximize power output by an individual PV module, a PV string, and/or a PV array by simply maximizing the current delivered to the DC link. This simplicity allows for increased reliability and decreased cost of the PV power generation system due at least in part to the relatively high number of small DC to DC power converters needed for a highly distributed system. By distributing the DC to DC power converters throughout the PV power generation system, power from the entire PV array is maximized even in the presence of a module mismatch, shading, or other unbalancing effects, for example, soiling and/or transient events such as passing clouds. By properly controlling the DC to DC converters, the maximum array voltage can be safely limited and series diode isolation and fault tolerance can be achieved. Also, the configuration allows for arc fault detection of the PV modules. Cost, size, and weight of the DC to DC converters are reduced because the power converters are rated for a significantly smaller power than the total power that is delivered by the system.

Technical effects of the methods, systems, and apparatus described herein include at least one of: (a) configuring a partial power converter to determine a level of current flowing through at least one semiconductor switch included within the partial power converter; and (b) configuring the partial power converter to maximize the level of current flowing through the at least one semiconductor switch to maximize the power output of the at least one power generation unit.

FIG. 1 is a block diagram of an exemplary embodiment of a power generation system 10. In the exemplary embodiment, power generation system 10 includes a plurality of power generation units 12. In the exemplary embodiment, power generation system 10 is a PV power generation system that includes a plurality of PV units 12 coupled to form a PV array. In other words, each PV unit within the plurality of PV units 12 is electrically connected with at least one other PV unit within the plurality of PV units 12 to form the PV power generation system. PV units 12 may include, but are not limited to, a PV module, a PV string, and/or a group of PV strings. PV power generation system 10 also includes at least one DC to AC inverter 14. In the exemplary embodiment, PV units 12 deliver, for example only, megawatts or hundreds of kilowatts to DC to AC inverter 14. DC to AC inverter 14 conditions the DC power received from PV units 12 and delivers grid-quality power to an AC power grid 16. PV units 12 are connected in series and/or parallel strings which are then combined together at several levels for delivering their power to an input 18 of DC to AC inverter 14.

In the exemplary embodiment, PV units 12 include a first PV unit 22, a second PV unit 24, a third PV unit 26, a fourth PV unit 28, a fifth PV unit 30, and a sixth PV unit 32. First, second, and third PV units 22, 24, and 26 are coupled at, for example, a first string combiner 40, to form a first array of strings 42. Fourth, fifth, and sixth PV units 28, 30, and 32 are coupled at, for example, a second string combiner 46, to form a second array of strings 48. Furthermore, first array of strings 42 and second array of strings 48 are coupled, for example, by an array combiner 50. Array combiner 50 outputs DC power to DC to AC inverter 14. Although described as including six PV units, three arrays of strings, two string combiners, and an array combiner, PV power generation system 10 may include any number of PV units, arrays of strings, string combiners, and/or array combiners that allow PV power generation system 10 to function as described herein.

In the exemplary embodiment, PV power generation system 10 includes at least one DC to DC converter 68, for example, a first DC to DC converter 70, a second DC to DC converter 72, a third DC to DC converter 74, a fourth DC to DC converter 76, a fifth DC to DC converter 78, and a sixth DC to DC converter 80. In the exemplary embodiment, first DC to DC converter 70 is coupled between first PV unit 22 and string combiner 40, second DC to DC converter 72 is coupled between second PV unit 24 and string combiner 40, third DC to DC converter 74 is coupled between third PV unit 26 and string combiner 40, fourth DC to DC converter 76 is coupled between fourth PV unit 28 and second string combiner 46, fifth DC to DC converter 78 is coupled between fifth PV unit 30 and second string combiner 46, and sixth DC to DC converter 80 is coupled between sixth PV unit 32 and second string combiner 46.

In a first alternative embodiment, first DC to DC converter 70 is coupled between first string combiner 40 and array combiner 50 and second DC to DC converter 72 is coupled between second string combiner 46 and array combiner 50. In a second alternative embodiment, first DC to DC converter 70 is coupled between array combiner 50 and DC to AC inverter 14. Furthermore, the at least one DC to DC converter 68 may be positioned within PV power generation system 10 at any position that allows PV power generation system 10 to function as described herein. The power rating of, for example, first DC to DC converter 70, will vary depending on its position within PV power generation system 10.

The at least one DC to DC converter 68 is controlled to extract a maximum power from the plurality of PV units 12. In the exemplary embodiment, first DC to DC converter 70 is controlled to extract a maximum power from first PV unit 22, second DC to DC converter 72 is controlled to extract a maximum power from second PV unit 24, third DC to DC converter 74 is controlled to extract a maximum power from third PV unit 26, fourth DC to DC converter 76 is controlled to extract a maximum power from fourth PV unit 28, fifth DC to DC converter 78 is controlled to extract a maximum power from fifth PV unit 30, and sixth DC to DC converter 80 is controlled to extract a maximum power from sixth PV unit 32. In the first alternative embodiment, first DC to DC converter 70 is controlled to extract a maximum power from the combination of PV units 22, 24, and 26, and second DC to DC converter 72 is controlled to extract a maximum power from the combination of PV units 28, 30, and 32. In the second alternative embodiment, first DC to DC converter 70 is controlled to extract a maximum power from the combination of PV units 22, 24, 26, 28, 30, and 32.

Positioning DC to DC converter 68 closer to the individual PV units 22, 24, 26, 28, 30, and 32 increases the power that can be extracted from PV units 22, 24, 26, 28, 30, and 32. This is due at least in part to the fact that shading, soiling, or module mismatch in one part of a field of PV units will not affect power delivered by other PV units positioned in other parts of the field. However, positioning DC to DC converter 68 closer to the individual PV units 22, 24, 26, 28, 30, and 32 only increases the power that can be extracted from PV units 22, 24, 26, 28, 30, and 32 if DC to DC converter 68 is highly efficient since use of multiple inefficient DC to DC converters will not increase power extracted from PV units 22, 24, 26, 28, 30, and 32 when compared to use of one efficient DC to DC converter. Furthermore, positioning DC to DC converter 68 closer to the individual PV units is practical only if the cost of the converters is low enough such that it does not offset the monetary gains from the increased energy yield.

Figure 2:
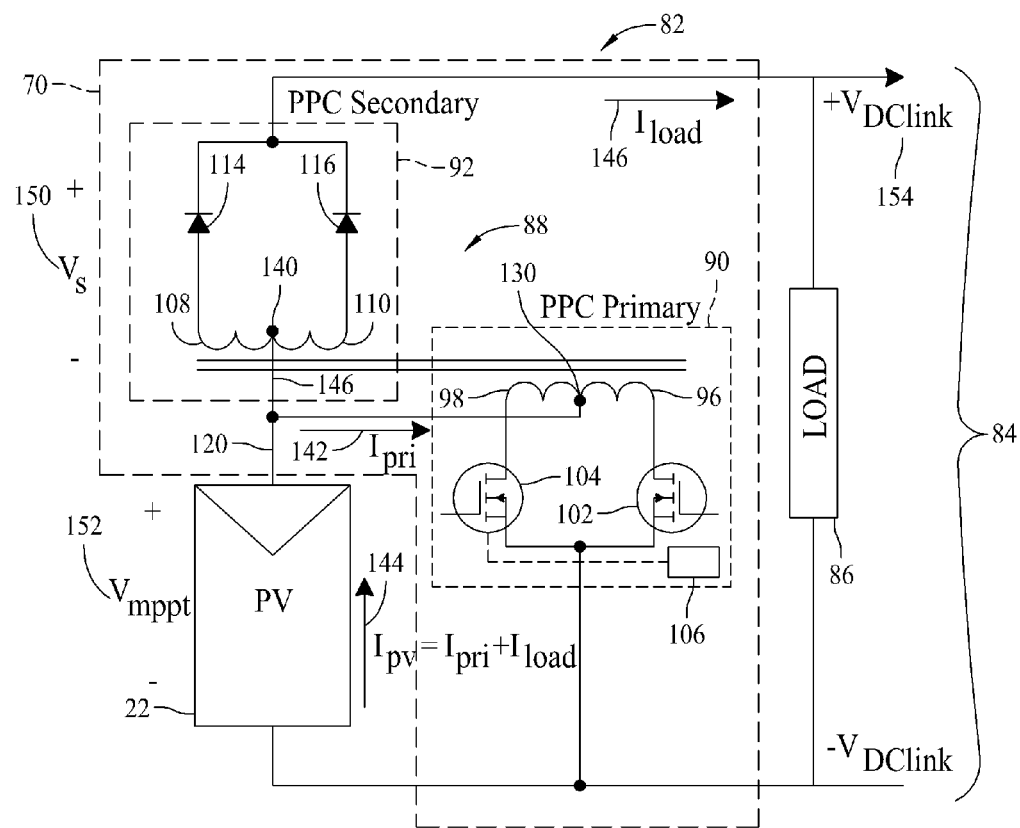
FIG. 2 is a circuit diagram of an exemplary DC to DC converter that may be included in the PV power generation system shown in FIG. 1.

FIG. 2 is a circuit diagram 82 of an exemplary embodiment of DC to DC converter 70 that may be included within PV power generation system 10 (shown in FIG. 1). In the exemplary embodiment, DC to DC converter 70 is coupled between a PV unit, for example, first PV unit 22, and a DC link 84. A DC load 86 may be positioned across DC link 84. DC load 86 may include, but is not limited to, a battery charger and/or a grid-tied inverter, for example, DC to AC inverter 14 (shown in FIG. 1). DC link 84 may be coupled to or included within DC to AC inverter 14, first string combiner 40 (shown in FIG. 1), second string combiner 46 (shown in FIG. 1), and/or array combiner 50 (shown in FIG. 1). DC to DC converter 70 is also referred to herein as a partial power converter (PPC) since only a portion of the power output of PV unit 22 is converted by DC to DC converter 70. The remaining portion of the power output of PV unit 22 is provided to DC to DC converter 70, but not converted and/or processed by DC to DC converter 70 before being provided to DC link 84.

In the exemplary embodiment, DC to DC converter 70 is configured as a push-pull-type converter that includes at least one transformer 88. Although illustrated as a push-pull-type converter, any other suitable DC to DC converter arrangement may be used. The at least one transformer 88 includes a primary section 90, also referred to herein as an input section, and a secondary section 92, also referred to herein as an output section. In the exemplary embodiment, primary section 90 includes at least one primary winding, for example, a first primary winding 96 and a second primary winding 98. Primary section 90 also includes at least one semiconductor device, for example, a first semiconductor device 102 and a second semiconductor device 104. Semiconductor devices 102 and 104 may include, but are not limited to including, insulated-gate bipolar transistors (IGBTs), metal-oxide-semiconductor field-effect transistors (MOSFETs), or bipolar junction transistors (BJT) implemented with silicon or wide band gap materials (e.g., silicon carbide and/or gallium nitride). In the exemplary embodiment, primary section 90 also includes a controller 106 that controls operation of semiconductor devices 102 and 104. For example, controller 106 may provide semiconductor device 102 with a control signal, wherein the duty cycle of the control signal controls a voltage output of DC to DC converter 70. In alternative embodiments, where the voltage of DC link 84 is regulated by DC to AC inverter 14, DC to DC converter 70 regulates the input voltage of associated PV units, for example, PV unit 22, by means of duty cycle control to extract maximum power from PV unit 22.

In the exemplary embodiment, secondary section 92 includes at least one secondary winding, for example, first secondary winding 108 and second secondary winding 110. Secondary section 92 also includes at least one semiconductor device, for example, a first diode 114 and a second diode 116. In the exemplary embodiment, an output 120 of PV unit 22 is coupled to a center tap 130 between first primary winding 96 and second primary winding 98 and to a center tap 140 between first secondary winding 108 and second secondary winding 110. A first portion ($I_{primary}$) 142 of a DC current ($I_{PV}$) 144 output by PV unit 22 is provided to primary section 90. A second portion, referred herein as either a load current or a DC link current ($I_{load}$ or $I_{DClink}$) 146, of the DC current output 144 of PV unit 22 is provided directly to secondary section 92. Primary section 90 and secondary section 92 are also mutual-inductively coupled. More specifically, primary windings 96 and 98 are mutual-inductively coupled to secondary windings 108 and 110. In operation, a time-varying current flowing through primary windings 96 and 98 induces a voltage across secondary windings 108 and 110.

In the exemplary embodiment, primary section 90 extracts a portion of the DC current generated by PV unit 22. Furthermore, secondary section 92 is coupled in series with PV unit 22 such that an output voltage 150 ($V_s$) of DC to DC converter 70 is in series with output voltage 152 ($V_{mppt}$) of PV unit 22. In other words, a voltage delivered to DC link 84, referred to herein as $V_{DClink}$ 154, is the sum of PV voltage 152 ($V_{mppt}$) and DC to DC converter voltage 150 ($V_s$). Moreover, the power delivered to DC link 84 exceeds the power processed and/or converted by DC to DC converter 70. Therefore, the power rating for DC to DC converter 70 can be lower than if all of the power delivered to DC link 84 was processed and/or converted by DC to DC converter 70. Even though the power rating for DC to DC converter 70 is lower than the power delivered to DC link 84, DC to DC converter 70 maintains the ability to control $I_{load}$ 146, also referred to as the DC link current. In the exemplary embodiment, DC link voltage 154 is controlled by DC to AC inverter 14, which is coupled to power grid 16 (shown in FIG. 1).

Figure 3:
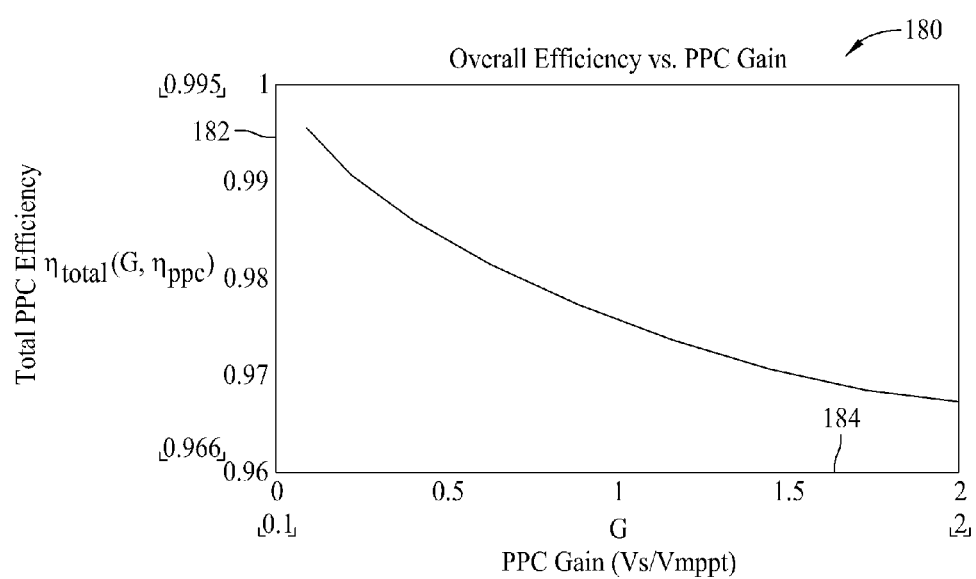
FIG. 3 is a plot of an overall efficiency of a power conversion performed by the DC to DC converter shown in FIG. 2, as a function of a gain of the DC to DC converter.

FIG. 3 is a simulated plot 180 of an overall efficiency 182 of a power conversion performed by a PPC, for example, DC to DC converter 70 (shown in FIG. 2), as a function of a gain 184 of DC to DC converter 70, assuming DC to DC converter 70 has a 95% efficiency. Gain 184 of DC to DC converter 70 is defined herein as an output voltage of DC to DC converter 70, for example, output voltage ($V_s$) 150 (shown in FIG. 2), divided by a voltage provided to DC to DC converter 70, for example, input voltage ($V_{mppt}$) 152 (shown in FIG. 2). In the exemplary embodiment, DC to DC converter 70 operates at gains less than approximately 0.5. As illustrated, at gains less than approximately 0.5, overall efficiency 182 of DC to DC converter 70 exceeds 98%. As the portion of the power being converted by DC to DC converter 70 decreases (i.e., as gain 184 decreases), overall efficiency 182 of DC to DC converter 70 increases.

Figure 4:
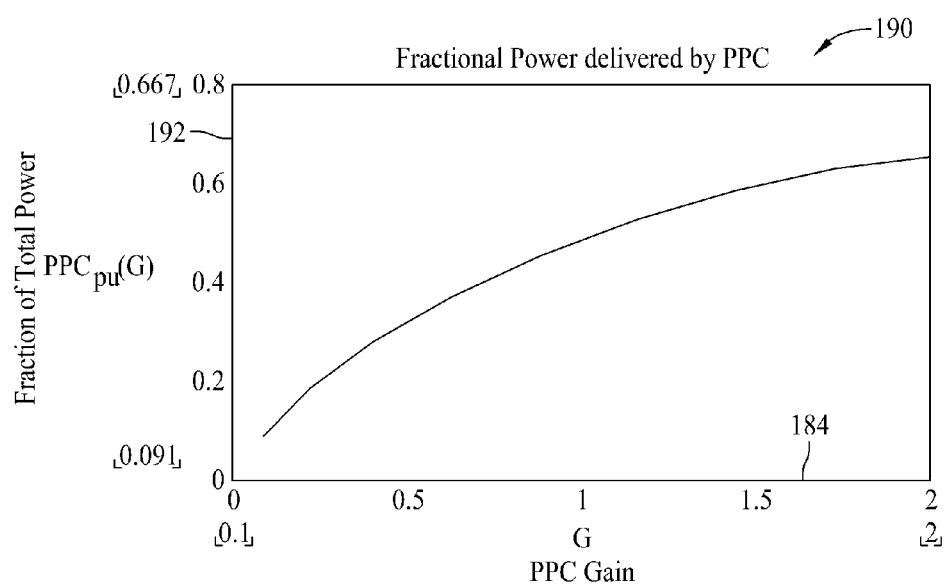
FIG. 4 is a plot of a fractional power delivered by the direct current (DC) to DC converter shown in FIG. 2, as a function of the gain of the DC to DC converter.

FIG. 4 is a simulated plot 190 of a fractional power 192 delivered by a PPC, for example, DC to DC converter 70 (shown in FIG. 2), as a function of gain 184. Fractional power 192 is defined herein as a portion of the DC power delivered by DC to DC converter 70 that is converted by DC to DC converter 70. For DC to DC converter 70 operating at gain 184 of less than approximately 0.5, fractional power 192 is approximately one-third of the total power delivered by DC to DC converter 70 to, for example, DC load 86 (shown in FIG. 2). Therefore, in the exemplary embodiment, the rated power of DC to DC converter 70 need only be roughly a third of the total power delivered to DC load 86. As illustrated, the actual power being converted by DC to DC converter 70 is significantly less than the total power delivered to DC load 86. By converting less than the total power delivered to DC load 86, a DC to DC converter having a lower rated power (i.e., the maximum power DC to DC converter 70 is rated as capable of converting without damage or excess wear) may be used in PV power generation system 10 (shown in FIG. 1). Lower rated converters typically are smaller, lighter, and lower in cost than higher rated converters.

Figure 5:
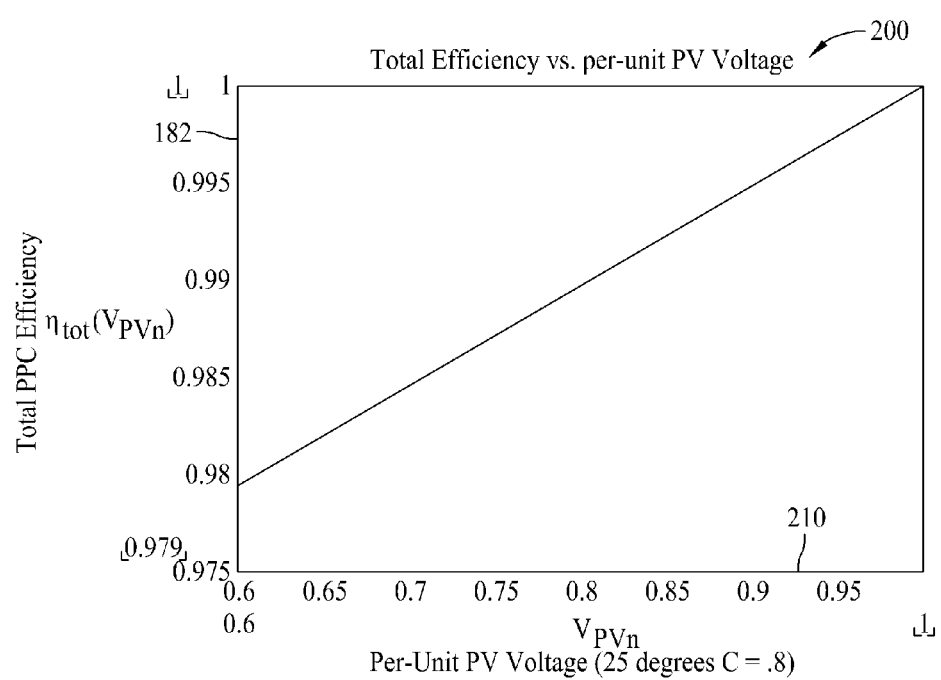
FIG. 5 is a plot of the overall efficiency of the DC to DC converter shown in FIG. 2, as a function of a percentage of power converted by the DC to DC converter.

FIG. 5 is a simulated plot 200 of the overall efficiency 182 (shown in FIG. 3) of a PPC, for example, DC to DC converter 70, as a function of a per-unit voltage 210. Per-unit voltage 210 is defined herein as a ratio of PV voltage ($V_{mppt}$) 152 (shown in FIG. 2) to DC link voltage ($V_{DClink}$) 154 (shown in FIG. 2). As PV voltage 152 approaches DC link voltage 154 (i.e., $V_{mppt}/V_{DClink}$ approaches one), the amount of power processed by DC to DC converter 70 decreases, and overall PPC efficiency 182 approaches 100%. By using DC to DC converter 70 to convert only a fraction of the DC power output by PV unit 22 (shown in FIG. 1), the converter rating, and accordingly, converter cost, size, and weight, can be significantly reduced. Furthermore, the resulting conversion efficiency can be increased beyond that of a full-power converter. Using this type of arrangement in a large PV system leads to more cost-effective energy yield trade-off. Furthermore, over expected ambient temperature ranges, for example, but not limited to, −40° Celsius (C) to 65° C., per-unit voltage 210 (i.e., $V_{mppt}/V_{DClink}$) is expected to vary between approximately 0.6 to 1.0. Efficiencies exceeding 98% can be expected over a relatively large PV voltage 152 variation.

Figure 6:
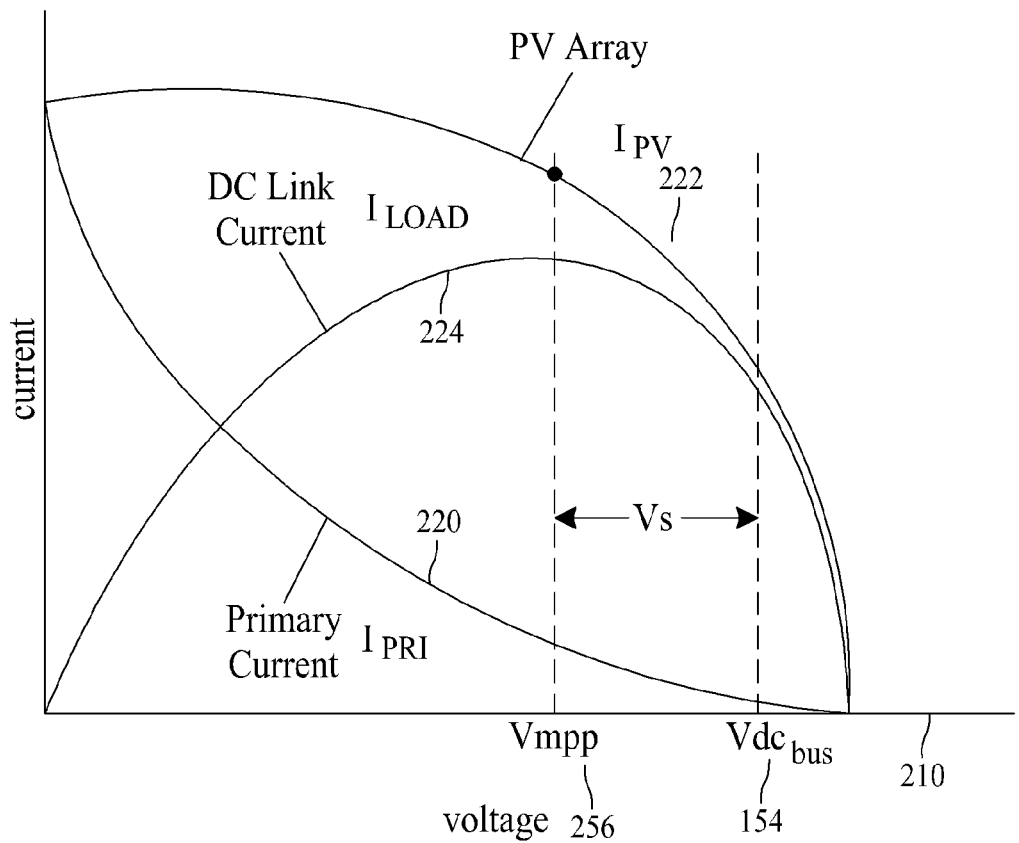
FIG. 6 illustrates exemplary current-voltage (IV) characteristics of the PV power generation system shown in FIG. 1.

FIG. 6 illustrates exemplary current-voltage (IV) characteristics of PV power generation system 10 (shown in FIG. 1). More specifically, FIG. 6 includes a first plot 220 of primary current ($I_{primary}$) 142 (shown in FIG. 2) as a function of per-unit voltage 210, a second plot 222 of PV current ($I_{PV}$) 144 (shown in FIG. 2) as a function of per-unit voltage 210, and a third plot 224 of DC load current ($I_{load}$) 146 (shown in FIG. 2) as a function of per-unit voltage 210. Since a DC to AC inverter, for example, DC to AC inverter 14 (shown in FIG. 1), controls DC link voltage 154, a maximum power from a given PV module or string occurs when $I_{DClink}$ 146, delivered to DC link 84 (shown in FIG. 2) by the PV array and controlled by DC to DC converter 70, reaches a maximum, for example, at $V_{mppt}$ 256. Therefore, a simple and easily implemented maximum power control algorithm is performed in which DC link current 146 delivered by each DC to DC converter in PV power generation system 10 is maximized. Thus the control of each DC to DC converter is simplified (e.g., maximize DC link current 146 to maximize power output). Only a current sensor is needed, which is a lower number of sensors than are needed for maximum power control of other circuit arrangements.

Figure 7:
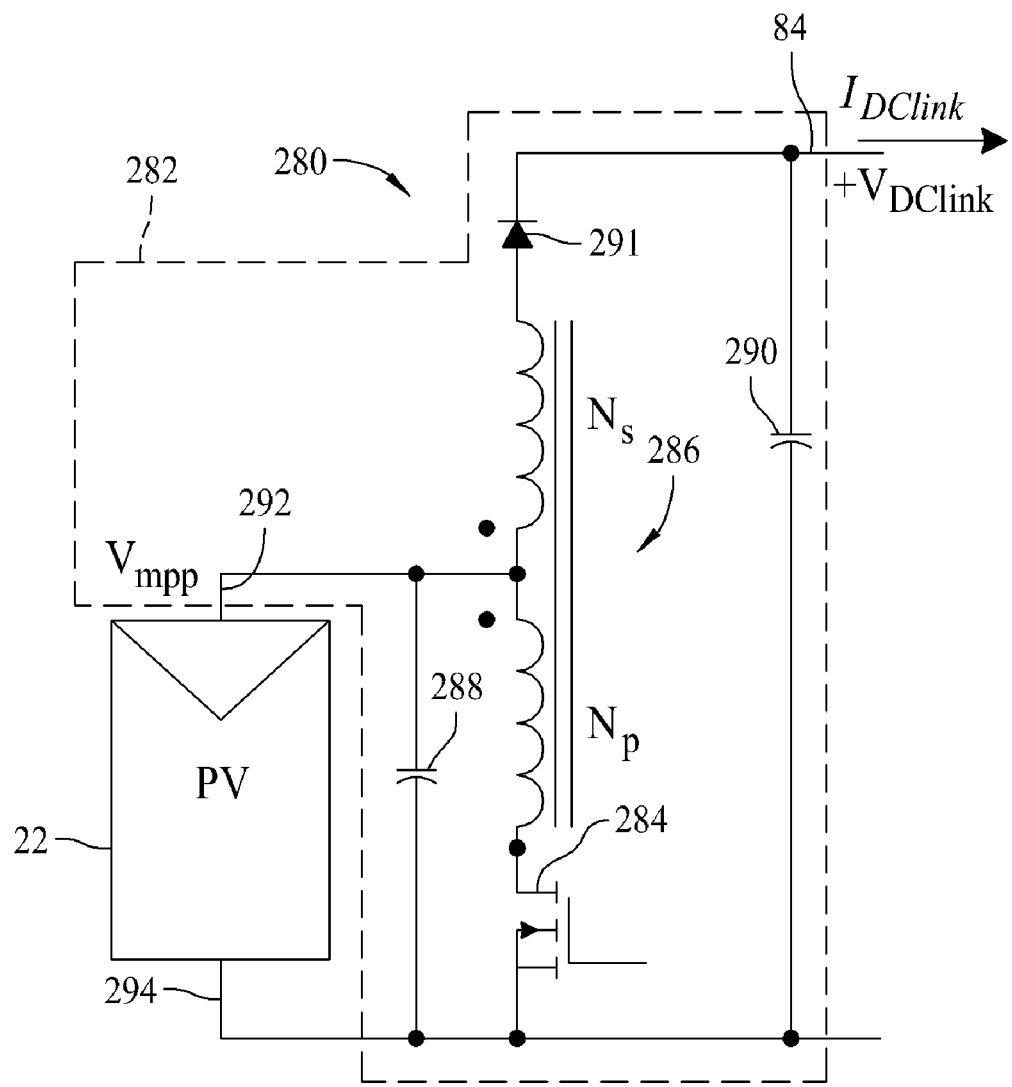
FIG. 7 is a circuit diagram of a first alternative embodiment of a DC to DC converter that may be included within the PV power generation system shown in FIG. 1.

FIG. 7 is a circuit diagram 280 of a first alternative embodiment 282 of DC to DC converter 70 (shown in FIG. 1). In the first alternative embodiment, DC to DC converter 282 includes a flyback converter configuration. DC to DC converter 282 includes a single transistor 284, a transformer 286, a first capacitor 288, a second capacitor 290, and a rectifying diode 291. Operation of the flyback converter is substantially similar to operation of the push-pull-type converter (shown in FIG. 2). The multiple transistors 102 and 104 included within DC to DC converter 70 enable its use in higher power applications than the flyback converter. However, the lower number of transistors included within the flyback converter provides a lower cost solution, suitable for lower power applications, when compared to the push-pull-type converter. For example, the power output of PV units 22, 24, 26, 28, 30, and 32 of the plurality of PV units 12 (all shown in FIG. 1) may be applied to DC to DC converter 282. Furthermore, in the alternative embodiment, transformer 286 has a rated power capacity that is lower than the rated power capacity of transformer 88 (shown in FIG. 2). The lower power rating of transformer 286 also leads to a lower cost converter. In the alternative embodiment, either a first side 292 or a second side 294 of PV unit 22 may be grounded, or alternatively, first side 292 and/or second side 294 may be ungrounded (i.e., floating).

Figure 8:
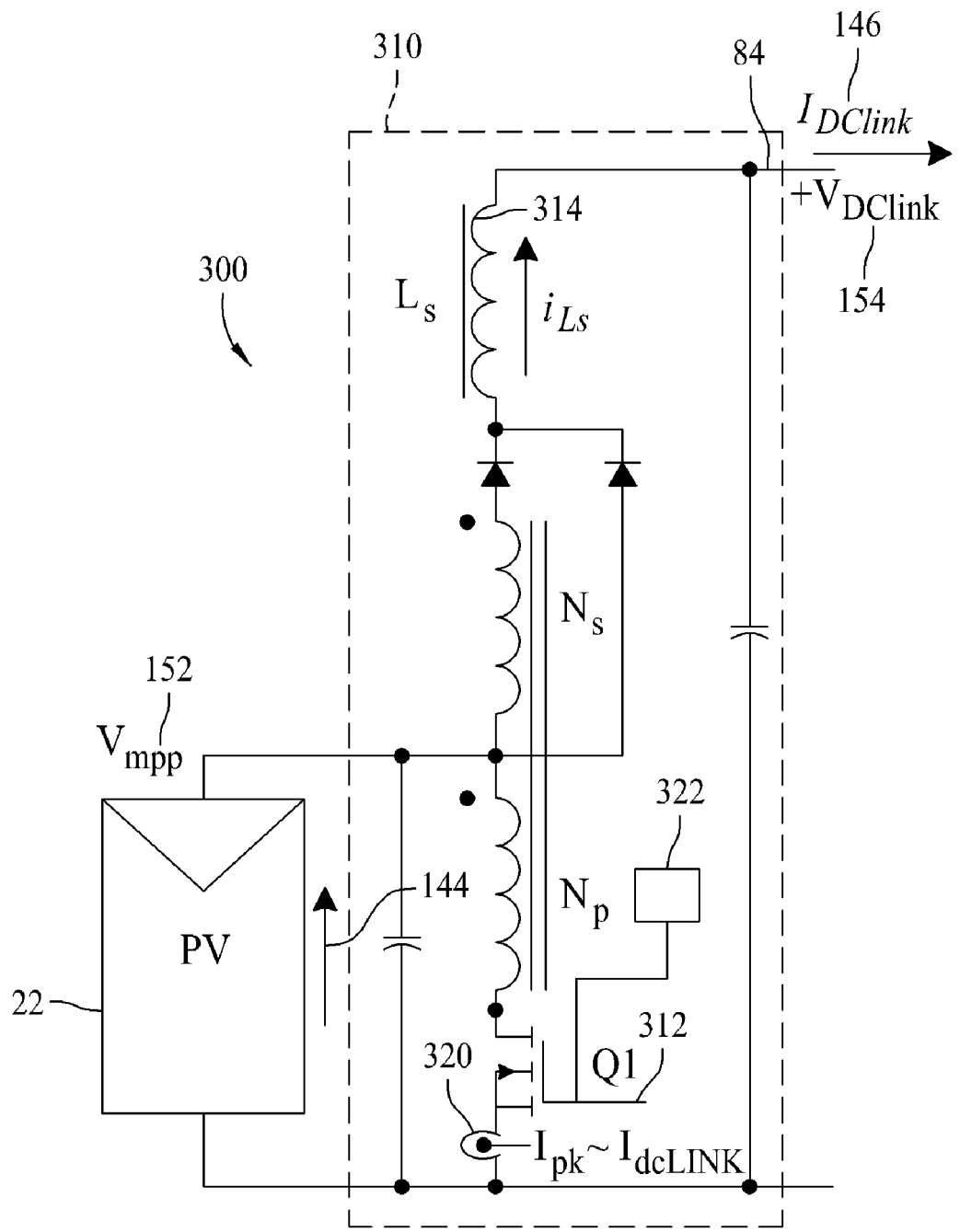
FIG. 8 is a circuit diagram of a second alternative embodiment of a DC to DC converter that may be included within the PV power generation system shown in FIG. 1.

FIG. 8 is a circuit diagram 300 of a second alternative embodiment 310 of DC to DC converter 70 (shown in FIG. 1). In the second alternative embodiment, DC to DC converter 310 includes a forward converter configuration. Similarly to first alternative embodiment 282 (shown in FIG. 7), DC to DC converter 310 includes a single transistor 312, however, DC to DC converter 310 is configured for use in medium power level applications due at least in part to the addition of a secondary inductor 314. A primary current ($I_{pk}$) 320 in transistor 312 is proportional to DC load current 146. As described above, the power delivered to DC link 84 is proportional to DC link current 146. Therefore, to maximize the PV power output of PV unit 22, primary current 320 in transistor 312 is sensed and maximized. Using this method of maximum power point tracking, a PV module output current sensor is not needed to maximize the PV power output of PV unit 22. In this manner, current 320, which is typically sensed for use in controlling DC to DC converter 310, is also used for maximum power tracking and no additional current sensors are needed to measure array current 144 or DC link current 146.

In the exemplary embodiment, transistor 312 is configured to protect DC to DC converter 70 from high voltages. More specifically, leaving transistor 312 "ON" prevents DC link voltage 154 from exceeding a predefined overvoltage level. Such a situation may occur, for example, during a startup of DC to DC converter 70, and when the ambient temperature is below the expected range and luminance is above an expected range. A maximum PV voltage level may be stored and/or accessed by, for example, a controller 322. If PV voltage 152 exceeds the maximum PV voltage level, controller 322 maintains transistor 312 in an "ON" state which creates a short circuit across PV unit 22. A maximum current output of PV unit 22 is limited to a level that is less than the maximum current that may be applied to DC to DC converter 70 without damaging components within DC to DC converter 70, for example, but not limited to, transistor 312.

Figure 9:
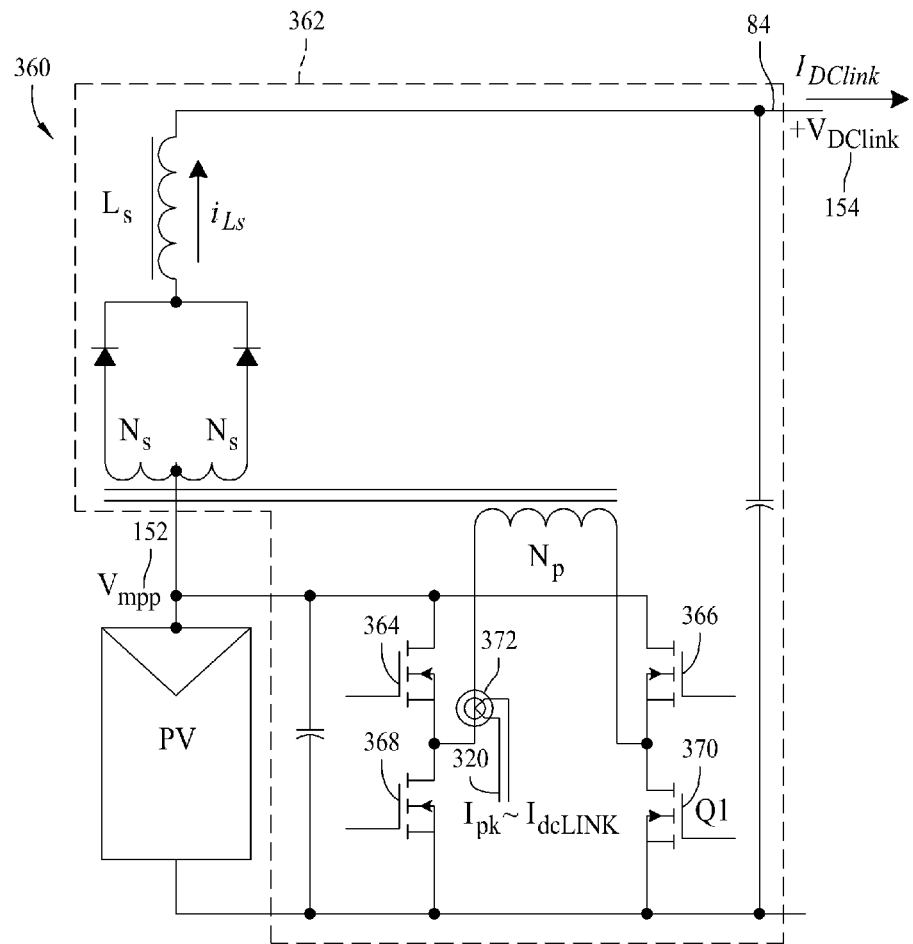
FIG. 9 is a circuit diagram of a third alternative embodiment of a DC to DC converter that may be included within the PV power generation system shown in FIG. 1.

FIG. 9 is a circuit diagram 360 of a third alternative embodiment 362 of DC to DC converter 70 (shown in FIG. 1). In the third alternative embodiment, DC to DC converter 362 includes a full-bridge converter configuration. DC to DC converter 362 includes a first transistor 364, a second transistor 366, a third transistor 368, and a fourth transistor 370, which allow DC to DC converter 362 to be used in higher power level applications, for example, power levels output by a string combiner, for example, string combiner 40, string combiner 46, and/or array combiner 50 (all shown in FIG. 1). As described with respect to DC to DC converter 310, maximum power extracted from PV unit 22 is achieved by maximizing primary current 320. DC to DC converter 362 includes a current sensing device 372 for measuring primary current 320 through fourth transistor 370. DC to DC converter 362 may be controlled by a hard switched pulse width modulated (PWM) signal, a soft-switched phase-shifted PWM signal, and/or any other suitable signal. Furthermore, maintaining transistors 364, 366, 368, and 370 in an "ON" state prevents DC link voltage 154 from exceeding a predefined overvoltage level when PV voltage 152 exceeds a predefined level, which may occur, for example, during startup, and/or at extremely cold and bright conditions.

Figure 10:
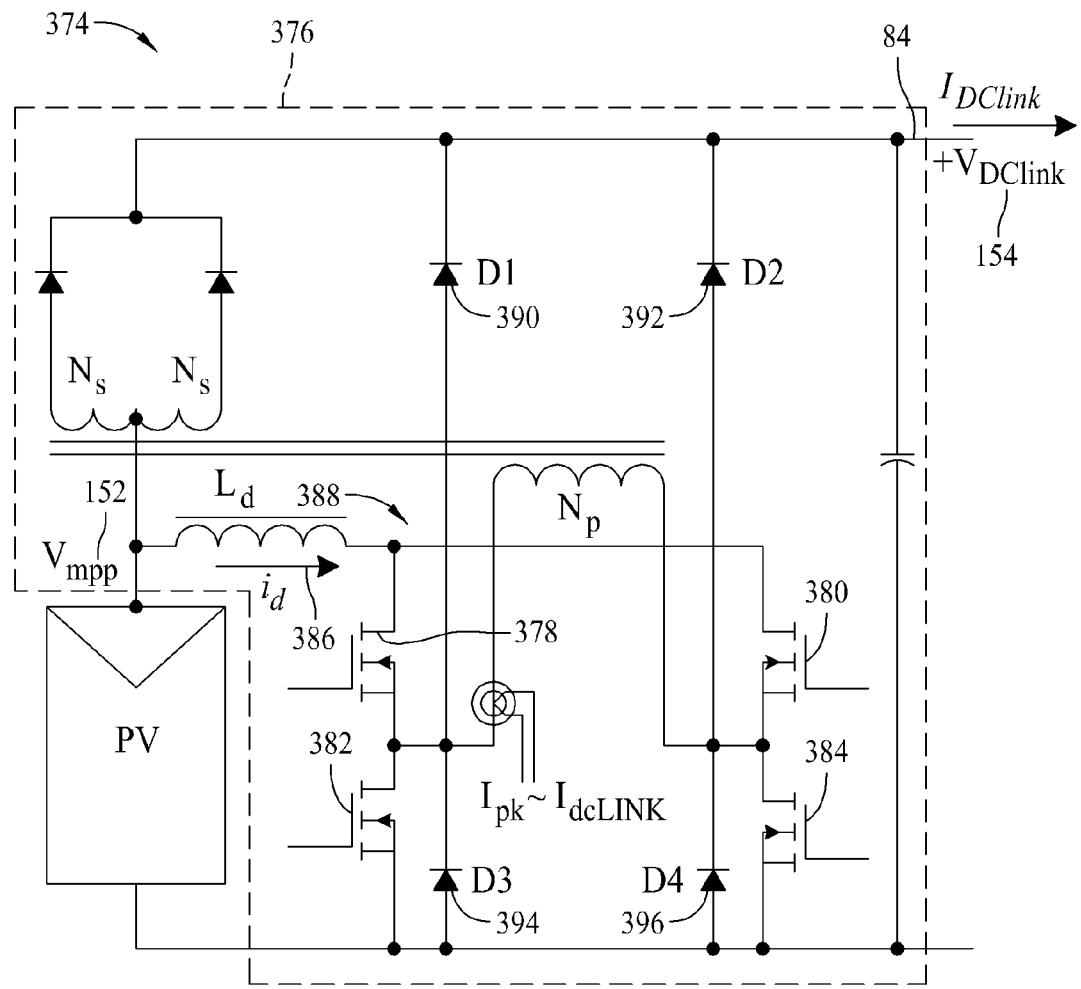
FIG. 10 is a circuit diagram of a fourth alternative embodiment of a DC to DC converter that may be included within the PV power generation system shown in FIG. 1.

FIG. 10 is a circuit diagram 374 of a fourth alternative embodiment 376 of DC to DC converter 70 (shown in FIG. 1). In the fourth alternative embodiment, DC to DC converter 376 includes a current-fed converter configuration. DC to DC converter 376 includes a first transistor 378, a second transistor 380, a third transistor 382, and a fourth transistor 384. A DC current ($I_d$) 386 is fed to a full bridge rectifier 388. Full bridge rectifier 388 includes a first diode 390, a second diode 392, a third diode 394, and a fourth diode 396. DC to DC converter 376 allows the DC link voltage ($V_{DClink}$) 154 to be used to clamp a voltage spike through clamping diodes 390 and 392. Thus, voltage spikes, which naturally occur when transistors 378, 380, 382, and 384 are switched, are clamped in a lossless manner by returning the energy to DC link 84.

Figure 11:
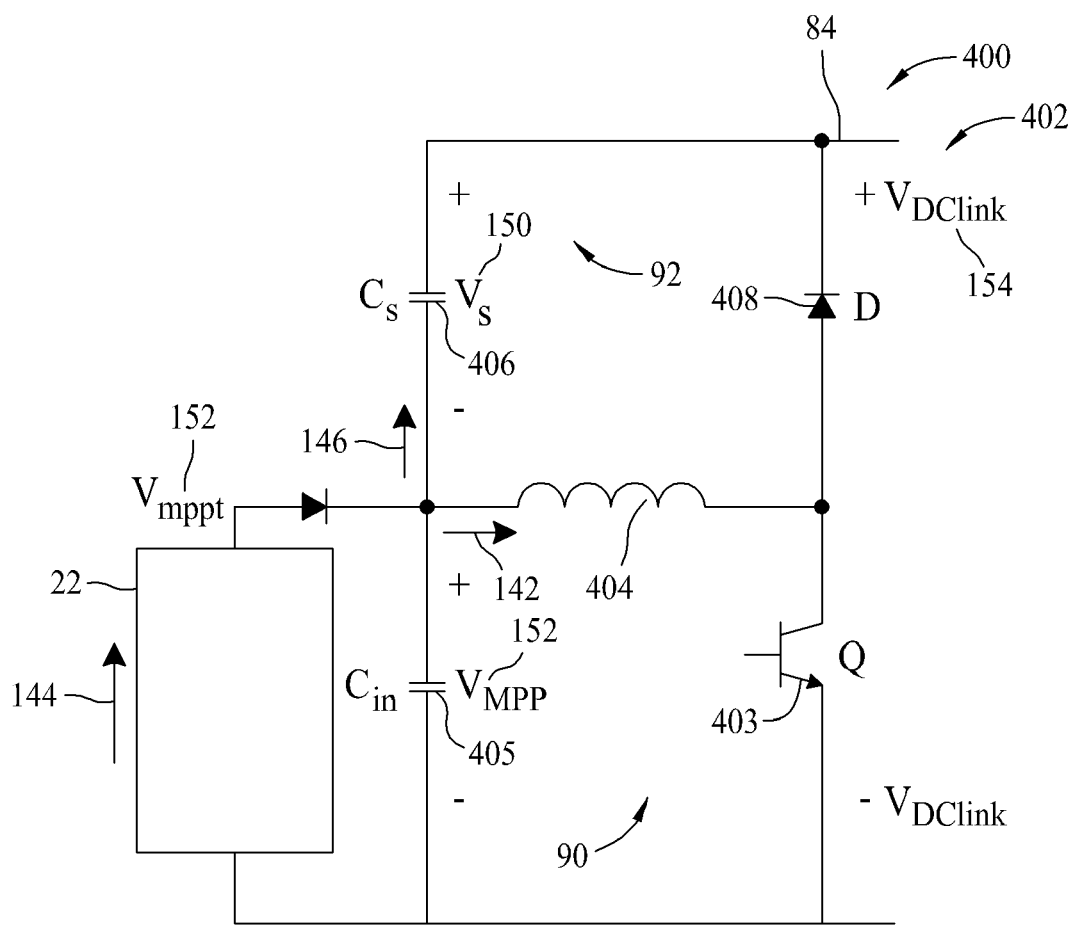
FIG. 11 is a circuit diagram of a fifth alternative embodiment of a DC to DC converter that may be included within the PV power generation system shown in FIG. 1.

FIG. 11 is a circuit diagram 400 of a fifth alternative embodiment 402 of DC to DC converter 70 (shown in FIG. 1). In the fifth alternative embodiment, DC to DC converter 402 includes a partial power processing buck-boost configuration. Input section 90 of DC to DC converter 402 includes a switch, for example, a transistor 403, an inductor 404, and an input capacitor 405. Output section 92 of DC to DC converter 402 includes an output capacitor 406 and may include a diode 408. DC to DC converter 402 does not include a transformer or an output rectifier. Rather, input section 90 is directly coupled (i.e., not mutual-inductively coupled) to output section 92. Therefore, DC to DC converter 402 is suitable for use in medium to high power applications.

An output voltage (i.e., $V_{DClink}$ 154) of DC to DC converter 402 equals a sum of an input voltage (i.e., PV array voltage 152, $V_{mppt}$) and a voltage across output capacitor 406 (i.e., $V_s$ 150). $V_{DClink}$ 154 is dependent upon a duty ratio (d) of transistor 403. More specifically, $V_{mppt}$ 152 and $V_s$ 150 are related by:

$$V_S = \frac{d}{1-d} V_{mppt} \qquad \text{(Formula 1)}$$

This non-inverting buck-boost converter relationship allows use of DC to DC converter 402 over a wide range of $V_{mppt}$ 152 variations (e.g., $V_s$ 150 may be either greater than or less than $V_{mppt}$ such that $V_{mppt}+V_S=V_{DClink}$). When $V_{mppt}$ 152 is less than $V_{DClink}$ 154, only a fraction of input voltage $V_{mppt}$ 152 is processed through DC to DC converter 402, wherein the fraction processed is dependent upon a voltage differential between $V_{mppt}$ 152 and $V_{DClink}$ 154. More specifically, the fraction of power processed by DC to DC converter 402, when $V_{mppt} \leq V_{DClink}$, may be calculated by:

$$\text{Fraction of Processed Power} = 1 - \frac{V_{mppt}}{V_{DClink}} \qquad \text{(Formula 2)}$$

When $V_{mppt}$ 152 is substantially equal to $V_{DClink}$, all of the input power is passed through DC to DC converter 402 without being processed and/or converted (i.e., all of $V_{mppt}$ 152 is routed to output section 92 and transistor 403 is turned to an "OFF" state). When $V_{mppt}$ 152 exceeds a predefined voltage level, transistor 403 is configured to limit $V_{mppt}$ 152 by remaining in an "ON" state. When maintained in the "ON" state, transistor 403 prevents PV array voltage 152 ($V_{mppt}$) from exceeding a predefined level, which may occur, for example, during startup, and/or at extremely cold and bright conditions.

In the circuits illustrated in FIGS. 2 and 7-11, transistors 102, 104, 284, 312, 364, 366, 368, 370, and 403 can be left "ON" to limit the array voltage ($V_{mppt}$) 152 in the event of an unusually high array voltage, which may occur, for example, in very cold and bright conditions. Transistors 102, 104, 284, 312, 364, 366, 368, 370, and/or 403 when maintained in an "ON" position are circuit protection elements that essentially "crowbar" DC link 84 to limit the PV array voltage ($V_{mppt}$) 152. By limiting $V_{mppt}$ 152, a power output of the PV unit 22 is reduced, preventing damage to PV unit 22. Furthermore, when in an "ON" position, transistors 102, 104, 284, 312, 364, 366, 368, 370, and/or 403 increase current ($I_{primary}$) 142 flowing to primary section 90, and therefore, decrease current ($I_{load}$) 146 flowing to DC load 86 (shown in FIG. 2) and/or to DC link 84 (shown in FIGS. 2 and 7-11). In addition, the PPC rectifying diodes, for example, diodes 114 and 116 (shown in FIG. 2) and/or diode 291 (shown in FIG. 7), in circuits 82, 280, 300, 360, and/or 374 serve a dual role of a rectifying diode and an isolating diode in the event of a converter or string failure. The diodes will prevent the failure from shorting DC link 84 and potentially causing a cascading failure in other converters in the system. Either end of the PV strings may be intentionally grounded or both ends can be left floating.

Figure 12:
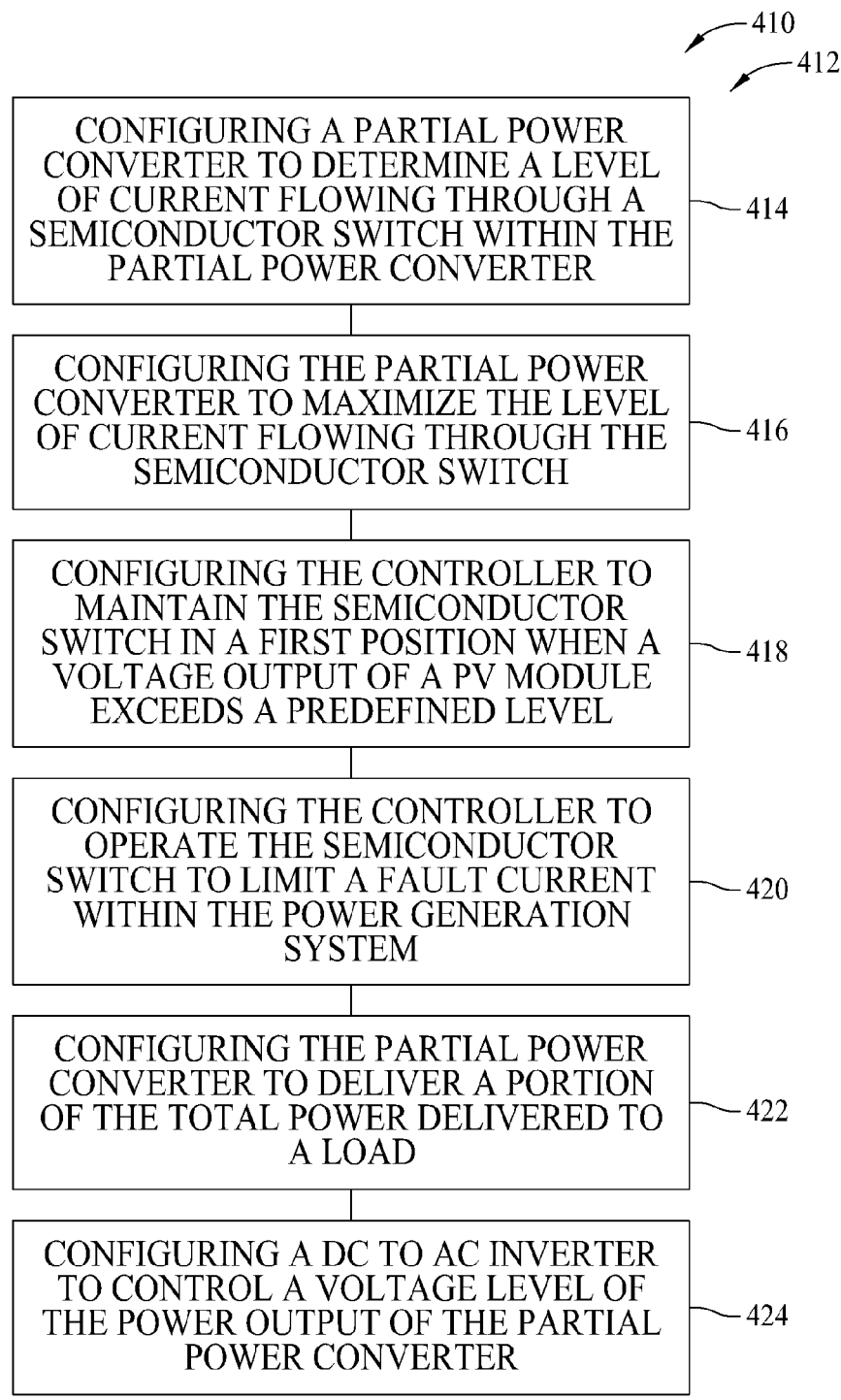
FIG. 12 is a flow chart of an exemplary method for operating the PV power generation system shown in FIG. 1.

FIG. 12 is a flow chart 410 of an exemplary method 412 for controlling operation of a power generation system, for example, PV power generation system 10 (shown in FIG. 1). As described above, power generation system 10 includes at least one power generation unit, for example, PV unit 22 (shown in FIG. 1), and at least one partial power converter, for example, DC to DC converter 70 (shown in FIG. 1). Furthermore, DC to DC converter 70 includes a controller, for example, controller 106 (shown in FIG. 2) configured to control operation of at least one semiconductor switch, for example, transistor 102 and/or transistor 104. In the exemplary embodiment, method 412 includes configuring 414 partial power converter 70 to determine a level of current flowing through transistor 102 and configuring 416 partial power converter 70 to maximize the level of current flowing through transistor 102 and therefore maximize a power output of PV unit 22.

In the exemplary embodiment, method 412 also includes configuring 418 controller 106 to maintain transistor 102 in a first position, for example, an "ON" position, when a voltage output of PV unit 22 exceeds a predefined level, for example, during startup, and at extremely cold and bright conditions. Controller 106 is also configured 420 to operate transistor 102 to limit a fault current within power generation system 10.

Method 412 also includes configuring 422 partial power converter 70 to deliver a portion of the total power delivered to a load, for example, to DC load 86 (shown in FIG. 2). Moreover, power generation system 10 also includes a DC to AC inverter, for example, DC to AC inverter 14 (shown in FIG. 1), and method 412 may also include configuring 424 DC to AC inverter 14 to control a voltage level of the power output of partial power converter 70.

The methods, systems, and apparatus described herein provide benefits over a full-power DC to DC converter that include: higher system efficiency and therefore high energy yield; lower rated power converter; smaller size; lower weight; lower cost; higher energy yield; and elimination of sensors for maximum power point tracking. The methods, systems, and apparatus described herein enable distributed architectures to be cost effective for large commercial and utility scale systems. In addition to commercial and utility scale systems, the methods, systems, and apparatus described herein may be applied to smaller systems such as residential or small commercial, at the module level. Furthermore, the size, cost, and weight reduction enabled by the methods, systems, and apparatus described herein enable easy integration of the DC to DC converter with the PV module (i.e., the DC to DC converter can be placed at a junction box within the PV power generation system).

Described herein are exemplary methods, systems, and apparatus for converting and controlling a portion of the power delivered by a PV module, string, or group of strings, which in comparison to converting all of the power delivered by a PV module, string, or group of strings leads to an increase in the overall efficiency of the conversion and reduces the cost of the converter. More specifically, the methods, systems, and apparatus described herein enable lower-power converters to be placed electrically nearer to the PV modules, for example, in a string combiner box or directly connected to a string output, since the lower-power converters have a lower cost and are rated at a power level similar to the power delivered by the PV module, string, or group of strings.

The methods, systems, and apparatus described herein facilitate efficient and economical power generation. Exemplary embodiments of methods, systems, and apparatus are described and/or illustrated herein in detail. The methods, systems, and apparatus are not limited to the specific embodiments described herein, but rather, components of each system and/or apparatus, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power generation system comprising:
   a plurality of power generation units each configured to output DC power, wherein the power generation units comprise photovoltaic units;
   a plurality of DC to DC partial power converters each coupled to a respective power generation unit and each comprising an input section and an output section, wherein the output section is coupled in series with the respective power generation unit, wherein each DC to DC partial power converter is configured to process a first portion of the DC power output of the respective power generation unit and to provide an unprocessed second portion of the DC power output of the respective power generation unit to the output section;
   at least one combiner for combining the DC power output from the output sections of the DC to DC partial power converters and providing the combined DC power to a main system DC link; and
   at least one DC to AC inverter coupled to the main system DC link and configured to control a voltage level of the power output from the DC to DC partial power converters on the main system DC link.

2. A system in accordance with claim 1, wherein, for each of the DC to DC partial power converters, the input section and the output section are directly coupled.

3. A system in accordance with claim 1, wherein each of the DC to DC partial power converters comprises at least one transformer, wherein the input section comprises a primary winding of the at least one transformer and the output section comprises a secondary winding of the at least one transformer, and wherein the primary winding receives the first portion of the DC power output of the power generation unit and induces a voltage across the secondary winding that is combined with the second unprocessed portion of the DC power output of the power generation unit and provided as the power output from the DC to DC partial power converter.

4. A system in accordance with claim 1, wherein each of the DC to DC partial power converters is configured to control a DC link current to extract a maximum power from the respective power generation unit.

5. A system in accordance with claim 4, wherein each of the DC to DC partial power converters is configured to maximize the current output from the DC to DC partial power converter to maximize the output power of the respective power generation unit.

6. The power generation system in accordance with claim 1, wherein each of the DC to DC partial power converters comprises at least one switch, and wherein each of the DC to DC partial power converters is configured to maintain the at least one semiconductor switch in a first position when a voltage output of the at least one power generation unit exceeds a predefined level.

7. The power generation system in accordance with claim 1, wherein each of the DC to DC partial power converters comprises at least one switch, and wherein each of the DC to DC partial power converters is configured to operate the at least one semiconductor switch to limit a fault current within the power generation system.

8. The power generation system in accordance with claim 1, wherein each of the DC to DC partial power converters comprises at least one diode for providing isolation under fault conditions.

9. The power generation system in accordance with claim 1, wherein each of the DC to DC partial power converters comprises at least one switch comprising silicon carbide, gallium nitride, or a combination thereof.

10. A direct current (DC) to DC partial power converter comprising:
   an input section configured to receive a first portion of a DC power output of a photovoltaic power generation unit, the input section comprising an input capacitor, a switch, and an inductor; and
   an output section configured to output a DC power that includes the first processed portion and a second unprocessed portion of the DC power output of the power generation unit to a DC link, the output section comprising an output capacitor and an output diode,
   wherein the output capacitor and the output diode are each connected to a positive node of a DC link, the input capacitor and the switch are each coupled to a negative node of the DC link, and the inductor is connected at one end between the input and output capacitors and at another end between the output diode and the switch.

11. A converter in accordance with claim 10, further comprising a controller configured to control a DC link current output of the output section to extract a maximum power from the power generation unit.

12. A converter in accordance with claim 10, wherein a rated power of the DC to DC partial power converter is less than the DC power output applied to the DC link.

13. The converter in accordance with claim 1, wherein the switch comprises silicon carbide or gallium nitride.

14. A method for controlling operation of a power generation system including at least one power generation unit, at least one partial power converter comprising at least one semiconductor switch, and a DC to AC inverter, the method comprising:
   configuring the partial power converter to determine a level of current flowing through the at least one semiconductor switch;
   configuring the partial power converter to maximize the level of current flowing through the at least one semiconductor switch to maximize a power output of the at least one power generation unit; and
   configuring the DC to AC inverter to control a voltage level of the power output of the partial power converter.

15. A method in accordance with claim 14, further comprising configuring the controller to maintain the at least one semiconductor switch in a first position when a voltage output of the at least one power generation unit exceeds a predefined level.

16. A method in accordance with claim 14, further comprising configuring the controller to operate the at least one semiconductor switch to limit a fault current within the power generation system.

17. A method in accordance with claim 14, further comprising configuring the partial power converter to deliver a portion of the total power delivered to a DC link.

* * * * *

UNITED STATES PATENT AND TRADEMARK OFFICE
CERTIFICATE OF CORRECTION

PATENT NO. : 8,330,299 B2  
APPLICATION NO. : 13/171683  
DATED : December 11, 2012  
INVENTOR(S) : Steigerwald et al.

Page 1 of 1

It is certified that error appears in the above-identified patent and that said Letters Patent is hereby corrected as shown below:

In Fig. 1, Sheet 1 of 12, delete " 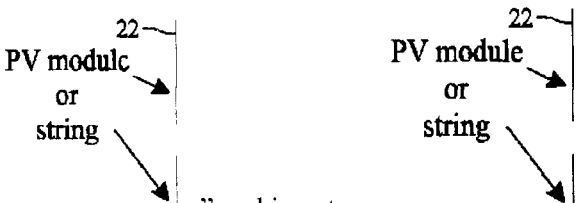 " and insert -- -- , therefor.

In Fig. 3, Sheet 3 of 12, delete " 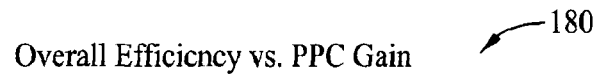 " and insert -- 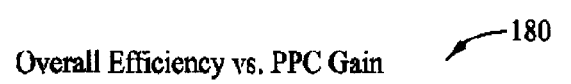 --, therefor.

In Column 8, Lines 25-26, delete "floating) ." and insert -- floating). --, therefor.

In Column 12, Lines 43-44, in Claim 4, delete "control a DC link current to".

Signed and Sealed this  
Nineteenth Day of February, 2013

Teresa Stanek Rea  
*Acting Director of the United States Patent and Trademark Office*